2,786,770
METHOD OF PRESERVING EGG MATERIAL

Arthur Rapport, Chicago, Ill., assignor to Lee Ratner, Chicago, Ill.

No Drawing. Application August 13, 1954, Serial No. 449,770

3 Claims. (Cl. 99—196)

The present invention relates to the preservation of egg products, and more particularly to the retardation of bacterial decomposition of frozen egg products during the thawing out period. In the commercial utilization of eggs it is customary to break eggs into suitable containers which then are sealed. The sealed containers are frozen and maintained under refrigeration until shortly before the eggs or egg products are to be used. They are then withdrawn from refrigeration and permitted to stand at room temperature. In the baking industry the time that the egg products are left to reach room temperature is rather indeterminate and not exact even where reasonably good production schedules are being followed. If any unforseen delays occur, the eggs or egg products lose their freshness, and not infrequently decomposition progresses to the extent that the eggs or egg products are unusable.

Therefore, it would be desirable to retard the bacterial decomposition or fermentation during the thawing out period and shortly thereafter to maintain freshness for an extended time. By eggs or egg products is meant broken whole eggs, egg whites, egg yolks or any admixture of egg yolks and whites in different proportions.

In accordance with the present invention it is proposed to add to eggs or egg products a relatively small quantity of a harmless ingredient tending to inhibit or retard for a limited time the normal bacterial decomposition or fermentation which is usually accompanied by a well known objectionable odor and flavor. Such decomposition or fermentation also affects other physical characteristics such as fluidity and color.

The ingredient to be added comprises a substituted methylnaphthoquinone such as 2 methyl-1-4 naphthoquinone, its homologs or its derivatives such as 2 methyl 3 methoxy-1-4 naphthoquinone, 2 methyl 3 chloro 1-4 naphthoquinone or 2 methyl 3 phytyl 1-4 naphthoquinone. The invention may be practiced by intimately incorporating or thoroughly mixing by agitation from 1 to 5 milligrams of the substituted methylnaphthoquinone, its homologs or its derivatives to one pound or 454 grams of liquid egg product, and then freezing the product. The manner in which the present invention may be practiced is apparent from the following examples. By means of a suitable agitator the following ingredients are thoroughly mixed:

| | Percent |
|---|---|
| Egg yolks | 90 |
| Sugar | 9 |
| Glycerol | 1 | which contain 1 milligram of a substituted methylnaphthoquinone such as menadione.

Another example of practicing the invention involved the preparation of a mixture of 600 milligrams of menadione stirred into 100 milliliters of glycerine. The mixture was then passed through a homogenizer to insure complete dispersion of the menadione in the glycerine. To each 454 grams of whole liquid eggs was added 0.33 milliliter of the solution by stirring. This proportion produces about 2 milligrams of menadione present in each 454 grams of whole liquid eggs or about one part menadione to 250,000 parts of egg material.

A further example of practicing the invention involved adding 20 milligrams of menadione and 1 milliliter of 3% hydrogen peroxide by stirring into 454 grams of liquid whole eggs.

Still another example consisted in adding 50 milligrams of 2 methyl 3 phytyl 1-4 naphthoquinone to each 454 grams of liquid whole eggs while simultaneously lowering the pH of liquid whole eggs from 7.5 to 6.8 by adding a solution of lactic acid.

A further example consisted of adding 10 milligrams of 2 methyl 3 methoxy 1-4 naphthoquinone to 454 grams of liquid whole eggs. In lieu of this 10 milligrams of 2 methyl 3 chloro 1-4 naphthoquinone may be used.

A comparison between the treated solutions of liquid eggs with untreated liquid eggs in each example showed that the treated egg solutions could be left in the same environment from 2 to 5 times as long as the untreated solution. In other words the untreated solution after several hours gave unmistakable indications of decomposition or fermentation. The treated solutions were left standing from 2 to 5 times as long without any such indications and were undistinguishable from fresh egg solutions by physical characteristics such as fluidity, color or odor. A bacteriological test of the first example showed that the untreated solution standing at 80° F. temperature for twenty-four hours contained 2,500,000 bacteria per gram. The treated solution at the end of that time contained less than 10,000 bacteria per gram. From the foregoing examples it becomes apparent that one part of 2 methyl 1-4 naphthoquinone preferably is distributed throughout from 250,000 to 22,700 parts of eggs.

The retardation of decomposition or fermentation of liquid egg products is for bakers a highly desirable characteristic. In the present instance this has been realized without any of the disadvantages of prior attempts where the substances employed often resulted in adulteration of the egg product or changed its normal characteristics or required some complicated process necessitating extreme exactness in control or otherwise was economically unjustified.

The foregoing detailed description of the invention and the various ways of practicing it are only for the purpose of making the invention clear, and hence the invention is not to be regarded as limited to such details, but only by the terms of the accompanying claims in which all novelty inherent therein is intended to be claimed as broadly as consistent with the teachings of the prior art.

I claim as my invention:

1. The method comprising adding a small quantity of a substituted 2 methyl 1-4 naphthoquinone to a quantity of glycerine, homogenizing the mixture, and stirring a small portion thereof into a composition consisting essentially of egg material to distribute at least one part substituted naphthoquinone to 250,000 parts of eggs.

2. The method of retarding decomposition of a composition consisting essentially of liquid egg material comprising stirring into the composition to disperse throughout at least one part of 2 methyl 1-4 naphthoquinone to 250,000 parts of egg material, and subsequently freezing the resultant composition.

3. The method of retarding fermentation of a composition consisting essentially of liquid egg material comprising stirring into the composition to disperse therethrough one part of 2 methyl 1-4 naphthoquinone to 22,700 to 250,000 parts of egg material, simultaneously lowering the pH of the composition by 0.7, and subsequently freezing the composition.

(References on following page)

References Cited in the file of this patent

UNITED STATES PATENTS

| | | |
|---|---|---|
| 1,635,843 | Hofmann | July 12, 1927 |
| 1,914,121 | Hammersley | June 13, 1933 |
| 2,150,616 | Thilenius | Mar. 14, 1939 |
| 2,348,976 | Hyman | May 16, 1944 |
| 2,525,096 | Damuth | Oct. 10, 1950 |

FOREIGN PATENTS

| | | |
|---|---|---|
| 306,013 | Great Britain | Feb. 11, 1929 |
| 325,045 | Great Britain | Feb. 13, 1930 |